(12) United States Patent
Kohno

(10) Patent No.: US 7,301,697 B2
(45) Date of Patent: Nov. 27, 2007

(54) MICROSCOPE DEVICE

(75) Inventor: Shinichi Kohno, Saitama (JP)

(73) Assignee: Fujinon Corporation, Saitama (JP)

( * ) Notice: Subject to any disclaimer, the term of this patent is extended or adjusted under 35 U.S.C. 154(b) by 147 days.

(21) Appl. No.: 11/003,428

(22) Filed: Dec. 6, 2004

(65) Prior Publication Data

US 2005/0141080 A1 Jun. 30, 2005

(30) Foreign Application Priority Data

Dec. 25, 2003 (JP) .............................. 2003-430029

(51) Int. Cl.
G02B 21/06 (2006.01)
G02B 21/00 (2006.01)
(52) U.S. Cl. ................... 359/386; 359/371; 359/385
(58) Field of Classification Search ........ 359/368–390, 359/431, 831–837, 641, 495–497; 250/216, 250/227; 600/160–171
See application file for complete search history.

(56) References Cited

U.S. PATENT DOCUMENTS

| | | | | |
|---|---|---|---|---|
| 4,746,203 A | * | 5/1988 | Nishioka et al. ............ 359/834 |
| 4,930,896 A | * | 6/1990 | Horikawa ................... 356/609 |
| 5,120,953 A | * | 6/1992 | Harris ...................... 250/227.2 |
| 5,132,526 A | * | 7/1992 | Iwasaki .................... 250/201.3 |
| 5,162,648 A | * | 11/1992 | Iwasaki ....................... 250/216 |
| 5,939,709 A | * | 8/1999 | Ghislain et al. ............ 250/216 |
| 6,642,504 B2 | * | 11/2003 | Cathey, Jr. .................. 250/216 |

FOREIGN PATENT DOCUMENTS

JP 2001-350098 12/2001

* cited by examiner

Primary Examiner—Thong Q. Nguyen
(74) Attorney, Agent, or Firm—Snider & Associates; Ronald R. Snider

(57) ABSTRACT

Specularly reflected light from a convergence position on an object surface 31 enters a second critical-angle prism 14, another prism 15, and a first critical-angle prism 13 of a parallel beam selection optical system 20 in this order as a parallel beam traveling along the optical axis. The critical-angle prisms 13, 14 have critical angles of 45 degrees with respect to the wavelength of the light beam. Light beams other than the parallel light beam are removed at oblique surfaces 13a, 14a of the critical-angle prisms 13, 14, thereby allowing only the parallel light beam to exit as a regular light beam. This parallel beam is formed into a convergent light by a collimator lens 12, reflected by a half prism 11 and converged on an image pickup surface of an image pickup device 52. In this way, unnecessary noise light can be removed without placing a pin hole plate such as that placed before the image pickup plane in a confocal microscope.

9 Claims, 8 Drawing Sheets

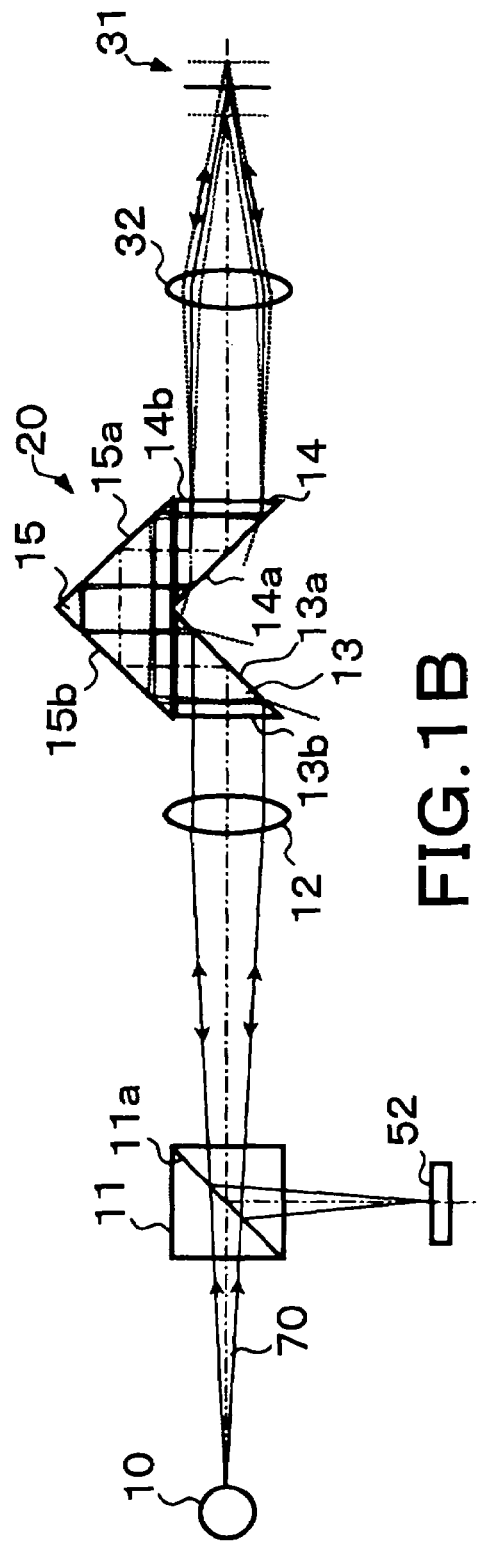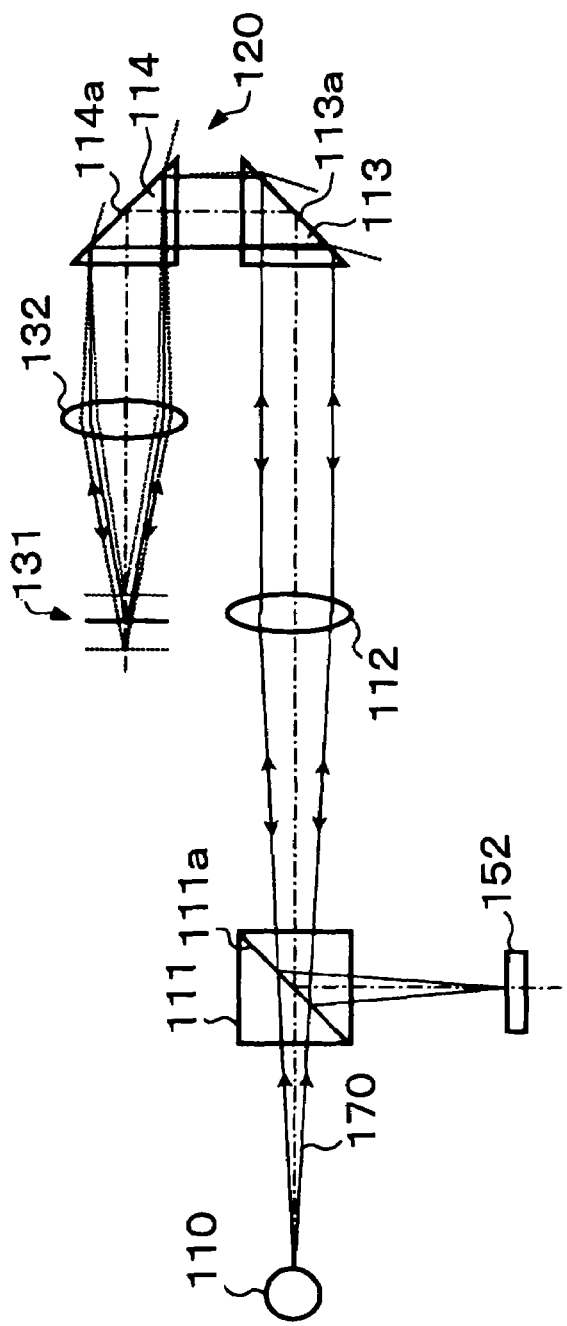

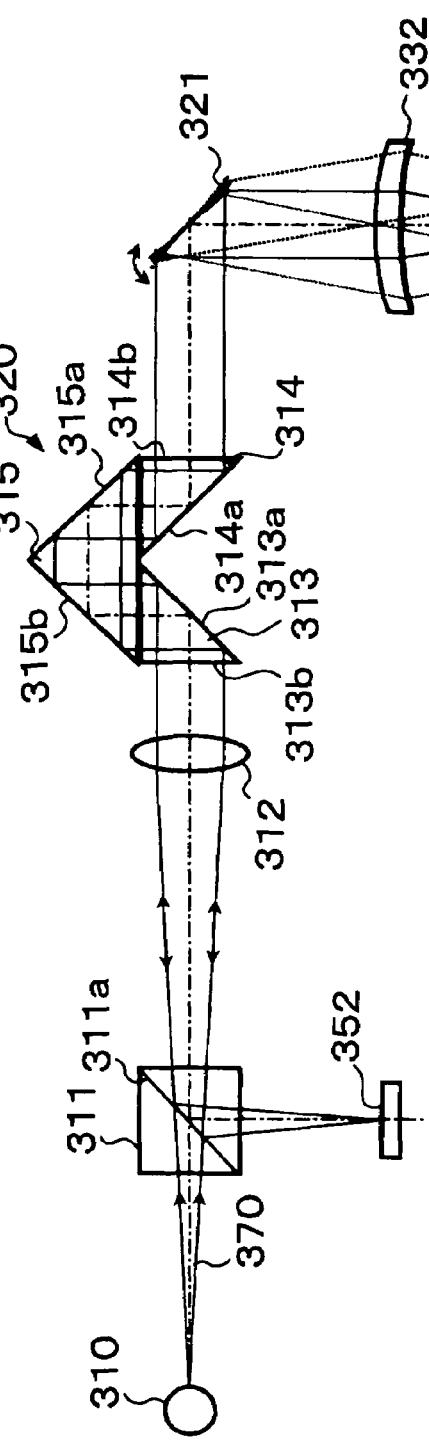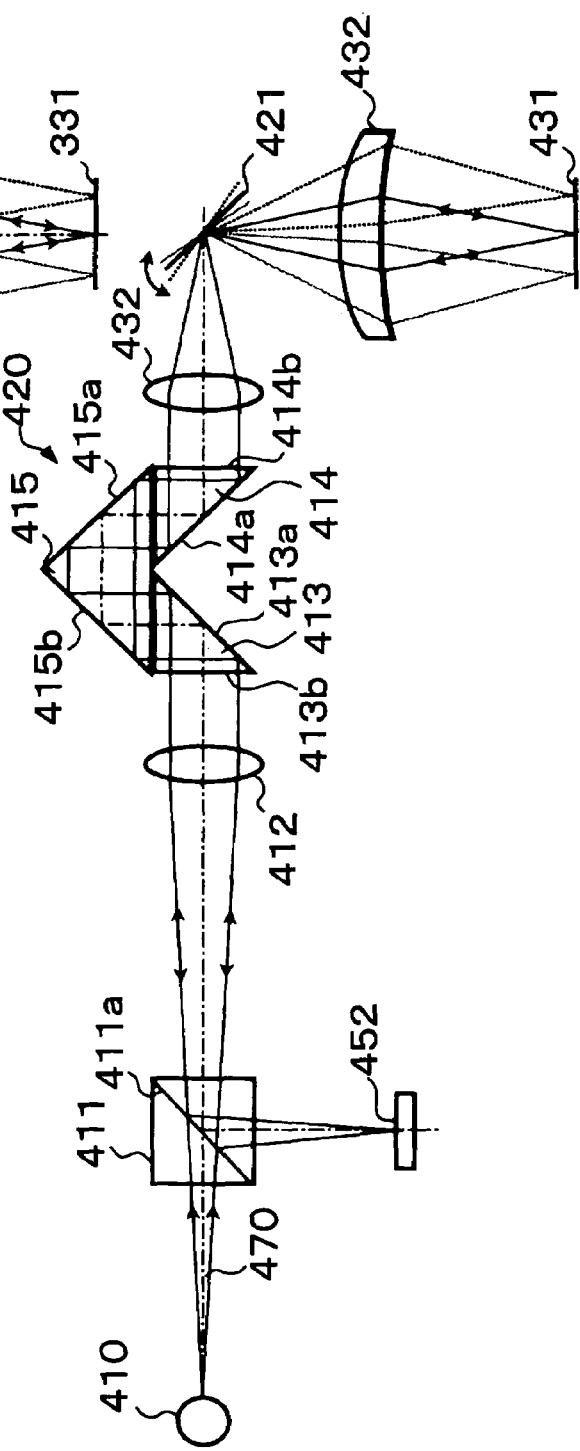

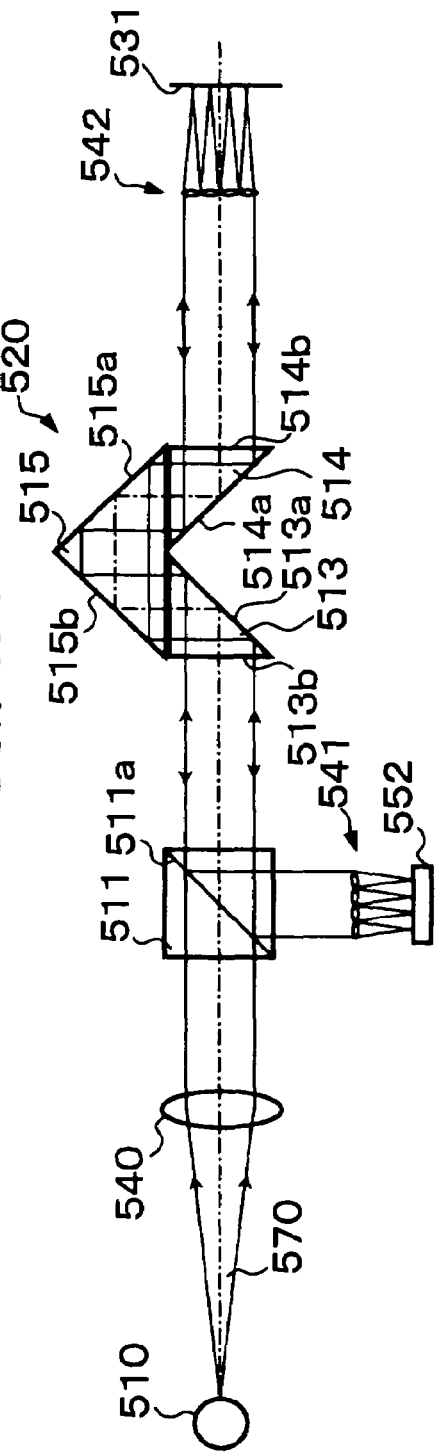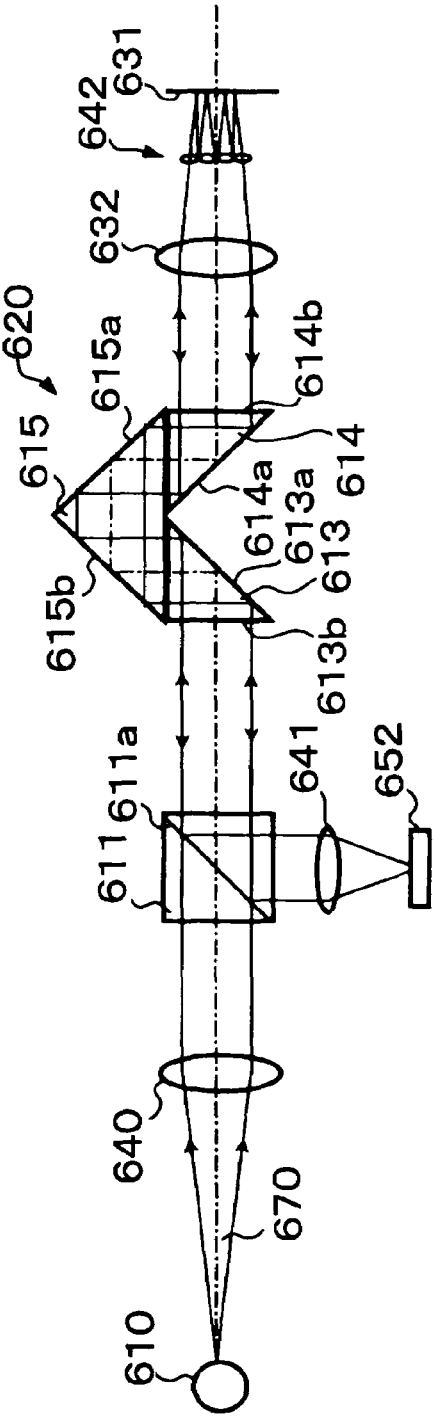

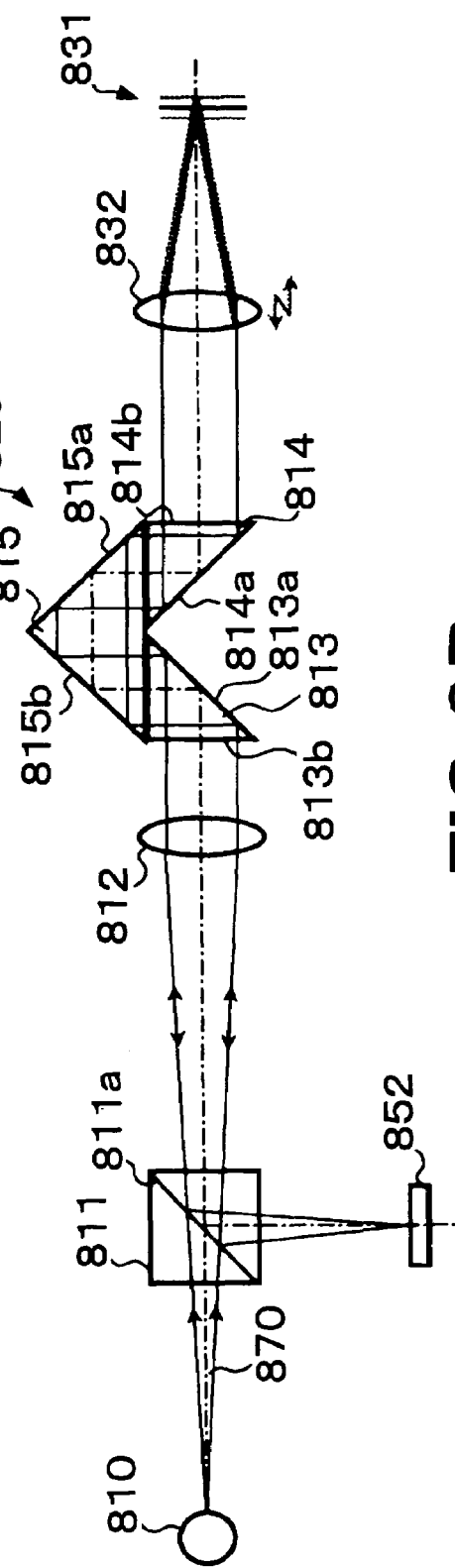
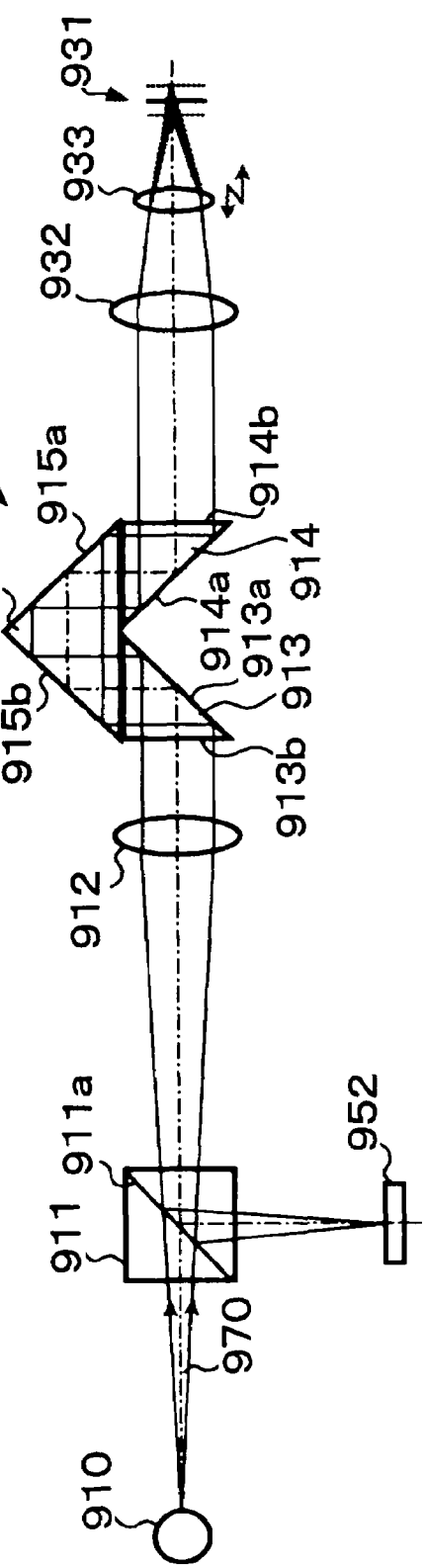

MICROSCOPE DEVICE

RELATED APPLICATIONS

This application claims the priority of Japanese Patent Application No. 2003-430029 filed on Dec. 25, 2003, which is incorporated herein by reference.

BACKGROUND OF THE INVENTION

1. Field of the Invention

The present invention relates to a microscope device which irradiates an object with probe light and receives reflected light from the object to obtain an image of the object and, more particularly, to a microscope device capable of obtaining an image of an object such as a human body tissue having an extremely large proportion of scattering light.

2. Description of the Prior Art

A confocal microscope for obtaining an image of an object for a medical or industrial purpose for example is known.

In the known confocal microscope, a point light source, a position at which an object is focused and a pin hole provided before an image pickup plane are placed in a conjugate positional relationship with each other, and reflected light from an out-of-focus point deviating from the one focal point on the object can be excluded from image forming information. The confocal microscope is therefore capable of obtaining an image having a high S/N ratio and high contrast. Also, the confocal microscope can have a markedly improved resolution in the direction along the optical axis because the so-called optical sectioning effect can be improved. The resolution in a lateral direction of the confocal microscope can also be improved in comparison with ordinary optical microscopes.

Various confocal probe devices using the principle of such a confocal microscope have also been proposed (for example, in Japanese Unexamined Patent Publication No. 2001-350098).

The confocal microscope has a number of improved effects but has a problem that restrictions are imposed on the freedom of device design, because it is necessary to adjust the pin hole plate to the predetermined position before the image pickup plane on condition that the above-mentioned three positions are set in a conjugate relationship, and because in ordinary cases there is a need to place the pin hole plate in a stage following the light source to form a point light source.

SUMMARY OF THE INVENTION

In view of the above-described circumstances, an object of the present invention is to provide a microscope device capable of improving the S/N, contrast and resolution of an image like the confocal microscope while reducing at least the restriction on the device design freedom due to the adjustment of the placement of the pin hole plate at a predetermined position.

To achieve the above-described object, the present invention provides a microscope device having a convergence optical system in which an illumination light beam from a light source portion is caused to strike an object while being converged by an objective lens, and in which a light beam reflected from a convergence point on the object and returned to the objective lens is converged at a position on an image pickup plane in a conjugate relationship with the convergence point, the convergence optical system including a collimator lens provided in an optical path from the light source portion to the objective lens, the collimator lens forming the illumination light beam from the light source portion into a parallel light beam, and a parallel beam selection means provided in an optical path from the objective lens to the image pickup plane, the parallel beam selection means selecting only a light beam reflected from the convergence point and entering as a predetermined parallel beam, and allowing the selected light beam to exit therefrom.

Preferably, the parallel beam selection means is provided in the optical path between the collimator lens and the objective lens.

Preferably, the optical system includes a polarization beam splitter provided in the optical path from the light source portion and the parallel beam selection means at a separating point between the going path from the light source portion to the object and the return path from the object to the image pickup plane, and a ¼ wavelength plate is provided in the optical path between the parallel beam selection optical system and the objective lens.

Preferably, the optical system includes an optical scanning mechanism for moving the illumination light beam on the object for scanning along a direction at a predetermined angle from the optical axis of the objective lens (an arbitrary angle including a right angle).

Preferably, the optical system includes as the objective lens a microlens array in which a plurality of lens elements respectively equal to in focal length are two-dimensionally arranged, and a planar optical sensor capable of detecting reflected light beams formed from light beams passing through the plurality of lens elements by reflection at the respective focal points is provided at the image pickup plane.

Preferably, the convergence optical system includes an objective lens moving mechanism for moving the point of convergence of the illumination light beam in the axial direction of the light beam for scanning.

Preferably, the parallel beam selection means has at least two boundary surfaces successively receiving the reflected light beam as light incident thereon, and the two boundary surfaces is placed so that the angles of incidence of the predetermined light beam on the two boundary surfaces are substantially equal to the critical angles; a light beam incident on one of the boundary surfaces at an angle smaller than the critical angle is removed by transmission through the one of the boundary surfaces; a light beam incident on the one of the boundary surfaces at an angle larger than the critical angle and reflected by the same is incident on the other of the boundary surfaces and is removed by transmission through the other of the boundary surfaces; and only the light beam incident on the two boundary surfaces respectively at the critical angles is allowed to exit from the parallel beam selection optical system.

Preferably, the boundary surfaces in the parallel beam selection means are formed by combining a plurality of critical-angle prisms of a right-angle prism type, the boundary surfaces being provided in oblique surfaces of the critical-angle prisms.

Preferably, the parallel beam selection means is formed by combining a plurality of pairs of the critical-angle prisms.

Preferably, the light source portion has a plurality of light emission ends being two-dimensionally arranged.

Preferably, the convergence optical system is placed in a portion of an endoscope probe close to the tip of the probe.

BRIEF DESCRIPTION OF THE DRAWINGS

FIGS. 1A and 1B are diagrams showing optical system portions in microscope devices in a first embodiment of the present invention;

FIGS. 3A and 3B are diagrams showing optical system portions in microscope devices in a third embodiment of the present invention;

FIGS. 4A and 4B are diagrams showing optical system portions in microscope devices in a fourth embodiment of the present invention;

FIGS. 6A and 6B are diagrams showing optical system portions in microscope devices in a sixth embodiment of the present invention;

DETAILED DESCRIPTION OF THE PREFERRED EMBODIMENTS

A microscope device in a mode of implementation of the present invention will be described with reference to the accompanying drawings.

Figure 8:
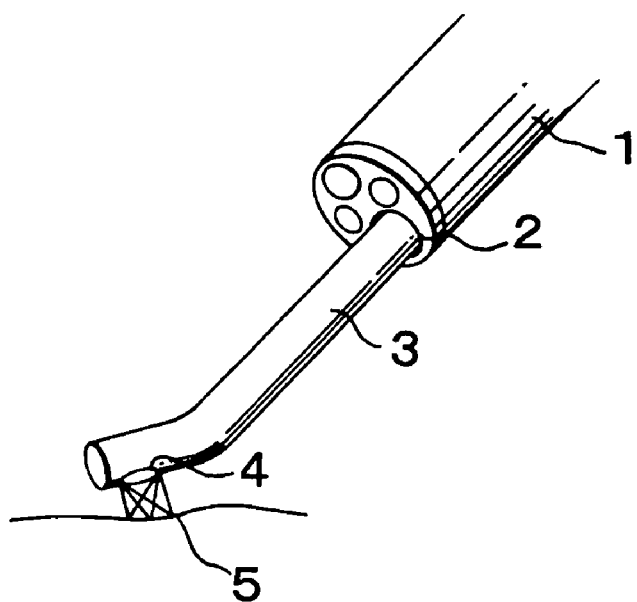
FIG. 8 is a diagram schematically showing an application of a microscope device in an example of implementation of the present invention to an endoscope apparatus.
Figure 9:
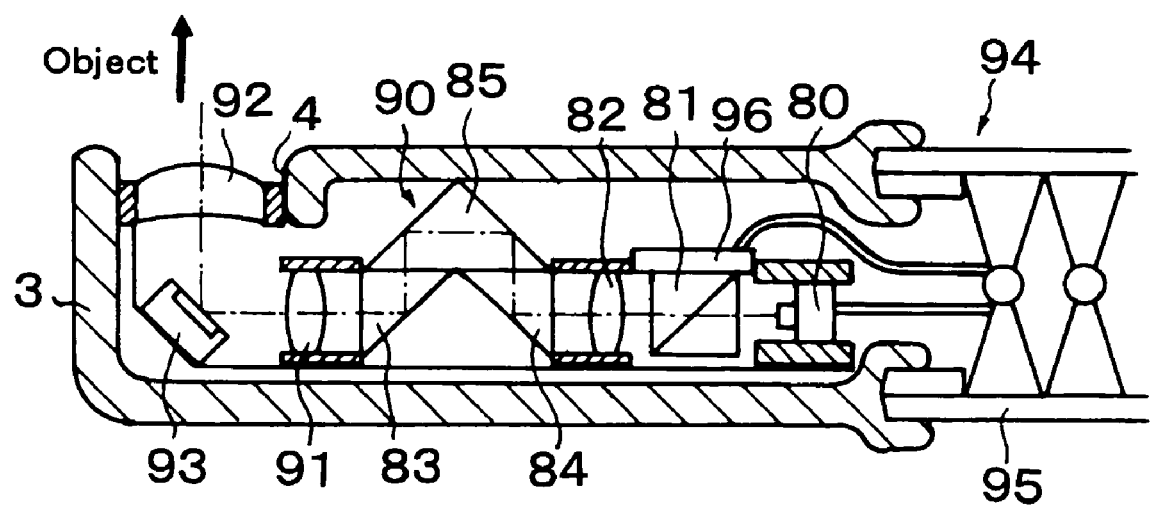
FIG. 9 is a partial cross-sectional view of an internal optical system portion of the microscope device shown in FIG. 8.

FIGS. 8 and 9 are diagrams schematically showing a microscope device in a mode of implementation of the present invention applied to an endoscope apparatus.

As shown in FIG. 8, the microscope device is provided in a probe 3 projecting out of an endoscope main body 1 through a forceps opening 2 formed in the endoscope main body 1, and an object (e.g. tissue of human body) 5 is observed through a detection window 4 formed in a side wall portion close to the tip of the probe 3.

As shown in FIG. 9, the microscope device has a semiconductor laser light source 80 and an optical system in which an illumination light beam from the light source 80 is caused to irradiate the surface of the object 5 while being converged by an objective lens 92, and in which the light beam reflected from the convergence point on the object 5 and returned to the objective lens 92 is converged at a position on an image pickup surface of an image pickup device 96 having a two-dimensional array of image pickup elements. A half prism 81, a collimator lens 82, a parallel beam selection means (parallel beam selection system) 90, a converging lens 91 and a micromirror device 93 are provided between the light source 80 and the objective lens 92. A portion of the probe 3 near the tip is constructed so as to be bendable by an angle mechanism 94 covered with an angle rubber member 95, as shown in FIG. 8, thereby improving the facility with which the object 5 is observed.

The half prism 81 having the function of transmitting the light beam from the light source 80 straight therethrough and the function of reflecting return light from the object 5 in the direction of the image pickup device 96.

The collimator lens 82 converts divergent light from the light source 80 into parallel light and converts light returned from the object 5 and transmitted through the parallel light selection means 90 from a parallel state into a convergent state, thereby converging the returned light at one point on the image pickup surface of the image pickup device 96.

The converging lens 91 has the function of causing the illumination light beam emitted from the parallel beam selection means 90 to strike the mirror of the micromirror device 93, and the micromirror device 93 is driven by a drive signal transmitted through wiring (not shown) to scan the illumination light beam striking the mirror surface in a predetermined direction.

The parallel beam selection means 90 is constituted by a prism assembly comprising three prisms 83, 84, and 85. The prism assembly selects only the light beam reflected from the above-mentioned convergence point and entering the parallel beam selection means 90 as a predetermined parallel light beam traveling along the optical axis, and allows the selected light beam to exit therefrom. Each of the prisms 83, 84, and 85 is a triangular prism whose triangular faces are right isosceles triangles. Each of the critical-angle prisms 83 and 84, forming a light incidence end and a light exit end respectively, in the prisms 83, 84, and 85 is formed so that the angle of incidence of the light beam its oblique surface is substantially equal to the critical angle. In the example of the parallel beam selection means 90 shown in FIG. 9, this critical angle is 45 degrees.

The microscope device in this implementation mode is thus constructed to enable the illumination light beam emitted from the light source 80 to pass through the parallel beam selection means 90 as a parallel beam and to strike the object 5 at one point, and to enable only the light beam specularly reflected from the convergence position on the object 5 in the light beam reflected by the object 5 to pass through the parallel beam selection means 90 as a parallel beam.

That is, only the light beam specularly reflected from the convergence position on the object 5 can be reflected each of the reflecting surface of the two critical-angle prisms 83 and 84 in the parallel beam selection means 90 to pass through the same. The light incident on the parallel beam selection means 90 other than this parallel light beam is refracted while being transmitted through one of the two reflecting surfaces and does not exit from the incidence/exit end surface of the parallel beam selection means 90.

The light beam specularly reflected from the convergence position on the object 5 and exiting from the incidence/exit end surface of the parallel beam selection means 90 enters the half prism 81 while being converged by the collimator lens 82 and is reflected by the half mirror surface of the half prism 81 to be converged on the image pickup surface of the image pickup device 96. Image information at the convergence point on the object 5 is thereby obtained on the image pickup device 96.

The position of the light emission point of the light source 80, the convergence position on the object 5 and the convergence point on the image pickup device 96 are in a conjugate relationship with each other in this optical system.

Essential portions of the arrangement of the above-described implementation mode will be described in detail with respect to embodiments of the present invention with reference to FIGS. 1 to 7.

FIG. 1A shows the configuration of the first embodiment.

A light beam 70 emitted from a point light source 10 travels through a half prism 11, a collimator lens 12, a parallel beam selection means 20 and an objective lens 32 to be converged at a desired position on an object 31. The light beam emitted from the point light source 10 is in a divergent state but it is formed into a parallel beam along an optical axis by the collimator lens 12, so that substantially the entire light beam passes through the parallel beam selection means 20. When the parallel light beam that has passed through the parallel beam selection means 20 is converged on the above-mentioned desired position by the objective lens 32, the desired position coincides with the focal point of the objective lens 32.

If the entire reflected light from the above-mentioned desired position (convergence position) on the object 31 is specularly reflected light, it is supposed to be converted into a parallel light beam by the objective lens 32 while traveling through the optical path in the direction opposite to the direction in which the light has traveled to the object 31. However, if the object 31 is, for example, a human skin tissue or the like, the reflected light includes scattering light and also includes light reflected from a near position relative to the convergence position.

Reflected light other than the reflected light from the desired position (convergence position) (hereinafter referred to as noise reflected light) acts as noise information to reduce the S/N ratio. Therefore it is necessary to remove the noise reflected light. This embodiment device is designed by considering output of such noise reflected light from the objective lens 32 in a state of being shifted from the parallel beam, and is constructed so that the light other than the parallel light beam traveling along the optical axis in the parallel light selection means 20 does not exit in the normal direction, thereby preventing the noise reflected light from reaching an image pickup device 52.

That is, the specularly reflected light from the convergence point enters a second critical-angle prism 14 in the parallel beam selection means 20 as a parallel light beam traveling along the optical axis. This second critical-angle prism 14 is a prism having the shape of a right isosceles triangle as seen in section, as is that in the first embodiment. The refractive index of the second critical-angle prism 14 is set to such a value that its critical angle with respect to the wavelength of the light beam is 45 degrees. The parallel light beam incident perpendicularly on an incidence/exit surface 14b on the second critical-angle prism 14 is incident on an oblique surface 14a of the second critical-angle prism 14 at an angle substantially equal to the critical angle, and therefore reaches a prism 15 by traveling through the optical path in the direction opposite to the direction in which the light beam has first entered the second critical-angle prism 14. The parallel beam that has entered the prism 15 is perpendicularly reflected at each of two prism surfaces 15a and 15b perpendicular to each other, and enters a first critical-angle prism 13 to be incident on an oblique surface 13a of the first critical-angle prism 13 at an incident angle of about 45 degrees. Since the refractive index of the first critical-angle prism 13 is also set to such a value that the critical angle with respect to the wavelength of the light beam is 45 degrees, the parallel light beam is incident on the oblique surface 13a substantially at the critical angle and therefore exits perpendicularly from an incidence/exit surface 13b of the first critical-angle prism 13 by traveling through the optical path in the direction opposite to the direction in which the light beam has first entered the first critical-angle prism 13. Thereafter, the parallel light beam is formed into a convergent light beam by the collimator lens 12, reflected by a reflecting surface 11a of the half prism 11, and converged at one point on the image pickup surface of the image pickup device 52.

On the other hand, the above-described noise reflected light enters the parallel beam selection means 20 at an angle slightly different from the angle at which the parallel light beam enters the parallel beam selection means 20, as shown in FIG. 1A. A portion of the noise reflected light incident on the oblique surface 14a of the second critical-angle prism 14 at an angle smaller than the above-described critical angle transmits through the surface 14a without being specularly reflected by the surface 14a. Therefore this light cannot pass through the parallel beam selection means 20 by traveling in the regular path. A portion of the noise reflected light incident on the oblique surface 14a of the second critical-angle prism 14 at an angle larger than the critical angle is specularly reflected by the surface 14a and travels toward the prism 15. However, this light is incident on the oblique surface 13a of the first critical-angle prism 13 at an angle smaller than the above-described critical angle and transmits through the surface 13b without being specularly reflected by the surface 13a. This light also cannot pass through the parallel beam selection means 20 by traveling in the regular path.

Consequently, only the specularly reflected parallel light beam from the convergence point exits from the incidence/exit surface 13b of the parallel beam selection means 20, while the above-described noise reflected light is removed.

The parallel beam selection means 20 is not limited to that illustrated in FIG. 1A. For example, a parallel beam selection means 120 such as shown in FIG. 1B may be arranged in which critical-angle prisms 113 and 114 are placed so that oblique surfaces 113a and 114a of the critical-angle prisms 113 and 114 face outward and are perpendicular to each other, and so that the specularly reflected light from the convergence point is incident on the oblique surfaces 113a and 114a at an incident angle of about 45 degrees.

In FIG. 1B, the components having the same functions as those of the components shown in FIG. 1A are indicated by reference characters each of which is the sum of 100 and the number in the corresponding reference character in FIG. 1A. Detailed description will not be made of the corresponding components.

Figure 2:
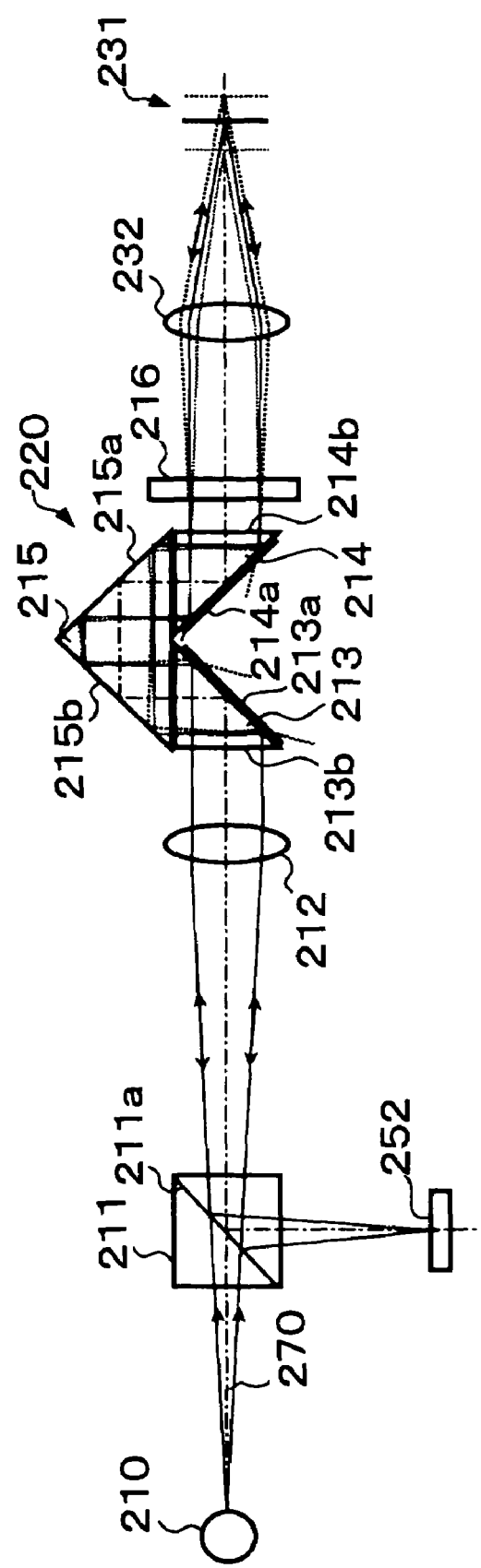
FIG. 2 is a diagram showing an optical system portion in a microscope device in a second embodiment of the present invention.

In the second embodiment shown in FIG. 2, a polarization beam splitter 211 is provided in place of the above-described half prism 11, and a ¼ wavelength plate 216 is provided between a parallel beam selection means 220 and an objective lens 232.

In the second embodiment, illumination light transmits through the polarization beam splitter 211 to be converted into one linear polarization (s-polarization), and return light is converted into another linear polarization (p-polarization) by transmitting through the ¼ wavelength plate 216 two times. Therefore, generally the entire light beam returned to the polarization beam splitter 211 is reflected by a polarization reflecting surface 211a. In this way, a fine light spot carrying object information can be obtained with efficiency.

Each of oblique surfaces 213a and 214a of two critical-angle prisms 213 and 214 in the parallel beam selection means 220 is coated with an optical thin film for increasing the amount of reflection with respect to s-polarization while preventing reflection with respect to p-polarization when the p-polarization is incident at an angle equal to or smaller than the critical angle. A light beam 270 in the s-polarization state from a point light source 210 enters the oblique surfaces 213a and 214a, and return light from an object 231 in the p-polarization state enters the oblique surfaces 213a and 214a. The light beam 270 from the point light source 210 is totally reflected at a rate substantially equal to 100% at the optical thin film (functioning as a reflection-increasing film), while the reflectivity at the optical thin film decreases abruptly with respect to the return light from the object 231 when the incident angle is equal to or smaller than the critical angle, thus reducing the reflection of unnecessary light (the optical thin film functions as an antireflection film with respect to unnecessary light).

For example, the entire optical system shown in FIG. 2 may constitute a three-dimensional scanner by being arranged so as to be capable of two-dimensional scanning along the surface of the object 231. In this way, three-dimensional object information can be obtained by using a scanner of a simple construction.

In FIG. 2, the components having the same functions as those of the components shown in FIG. 1A are indicated by reference characters each of which is the sum of 200 and the number in the corresponding reference character in FIG. 1A. Detailed description will not be made of the corresponding components.

The third embodiment shown in FIGS. 3A and 3B is arranged so that an object surface (convergence surface) 331 or 431 is one-dimensionally or two-dimensionally scanned with a light beam emitted from a parallel beam selection means 320 or 420. That is, one-dimensional or two-dimensional scanning with the light beam is performed by means of an optical scanner 321 or 421, e.g., a galvanometer mirror or a polygon mirror placed on the light source 310 or 410 side of an objective lens 332 or 432. It is possible to one-dimensionally or two-dimensionally obtain information on the object surface 331 or 431 by scanning the object surface with the illumination light beam in this manner.

In the arrangement shown in FIG. 3A, the illumination light beam is emitted to the optical scanner 321 in a state of being formed as a parallel light beam. In the arrangement shown in FIG. 3B, the illumination light beam is emitted to the optical scanner 421 while being converged from the parallel beam state through the converging lens 432. In the arrangement shown in FIG. 3(B), the optical scanner 421 can have a smaller mirror area.

In each of FIGS. 3A and 3B, the components having the same functions as those of the components shown in FIG. 1A are indicated by reference characters each of which is the sum of 300 or 400 and the number in the corresponding reference character in FIG. 1A. Detailed description will not be made of the corresponding components.

The fourth embodiment shown in FIGS. 4A and 4B is arranged so that a light beam emitted from a parallel light selection means 520 or 620 is converged at a plurality of points on an object surface (convergence surface) 531 or 631 by using a lens array 542 or 642 to simultaneously obtain object information from these points, thus increasing the speed of scanning on the object surface 531 or 631. This arrangement is effective in largely improving the lateral resolution while reducing the scanning time.

In the arrangement shown in FIG. 4A, the microlens array 542 is used as an objective lens, while a microlens array 541 is used as an image pickup lens. In the arrangement shown in FIG. 4B, a convex lens 632 is used in combination with the microlens array 642 as an objective lens, while an ordinary image pickup lens 641 is used on the half prism 611 side of an image pickup device 652.

In each of FIGS. 4A and 4B, the components having the same functions as those of the components shown in FIG. 1A are indicated by reference characters each of which is the sum of 500 or 600 and the number in the corresponding reference character in FIG. 1A. Detailed description will not be made of the corresponding components.

Figure 5:
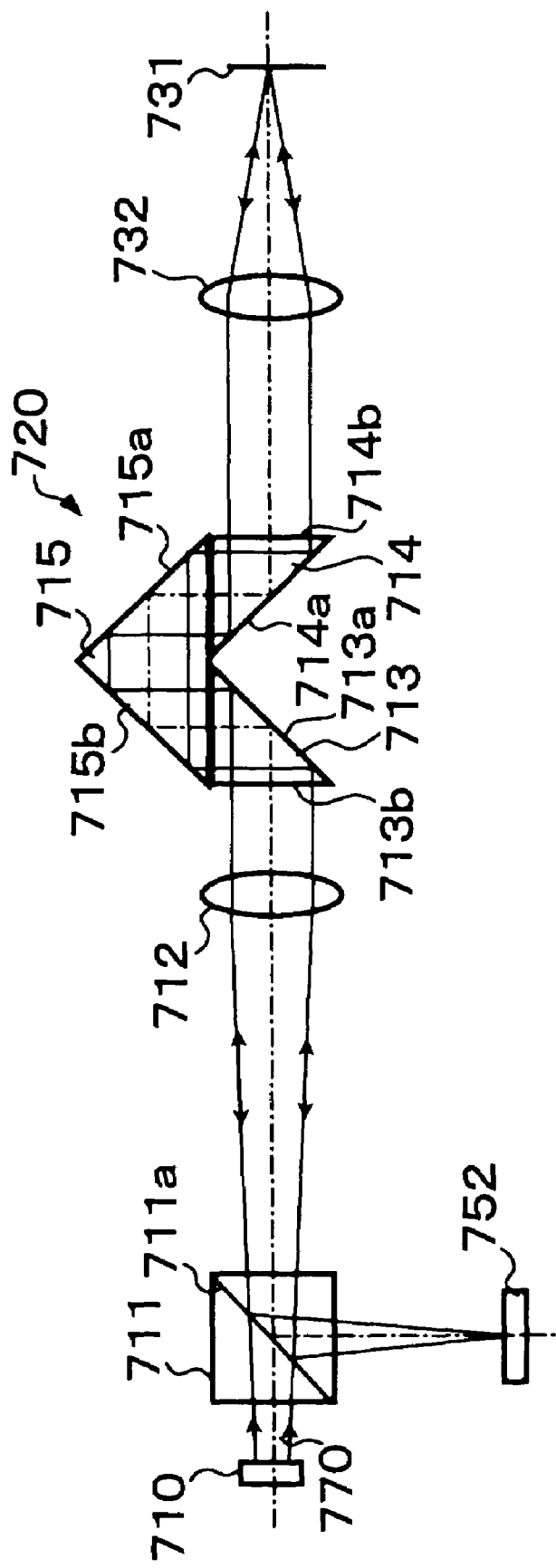
FIG. 5 is a diagram showing an optical system portion in a microscope device in a fifth embodiment of the present invention.

In the fifth embodiment shown in FIG. 5, an array of light emitting elements is used as a light source 710. That is, each element of the light source array 710 is a point light source, and illumination light beams 770 emitted from the point light sources are converged at one point on an object surface (focal plane) 731 while being superimposed one on another. In this way, the quantity of illumination light at the focal point is increased. That is, each element in the light source array 710 and the focal point are in such a relationship that one of them is an object point while the other is an image point.

In FIG. 5, the components having the same functions as those of the components shown in FIG. 1A are indicated by reference characters each of which is the sum of 700 and the number in the corresponding reference character in FIG. 1A. Detailed description will not be made of the corresponding components.

The sixth embodiment shown in FIGS. 6A and 6B is arranged in such a manner that the position at which an illumination light beam is converged (focal point) is changed by moving the whole or a portion of an objective lens 832 or 932 along an optical axis to change an object surface 831 or 931 to be observed in the depth direction, thereby enabling information in the depth direction to be obtained from one item to another. In this way, information on an object in the depth direction can be obtained as well as information in a lateral direction. This arrangement is suitable for a tomographic endoscope for example.

While in the arrangement shown in FIG. 6A the entire objective lens 832 is moved along the optical axis to change the position of the convergence point, one of the objective lenses 932 and 933 is moved along the optical axis to change the position of the convergence point in the arrangement shown in FIG. 6B.

In each of FIGS. 6A and 6B, the components having the same functions as those of the components shown in FIG. 1A are indicated by reference characters each of which is the sum of 800 or 900 and the number in the corresponding reference character in FIG. 1A. Detailed description will not be made of the corresponding components.

Figure 7:
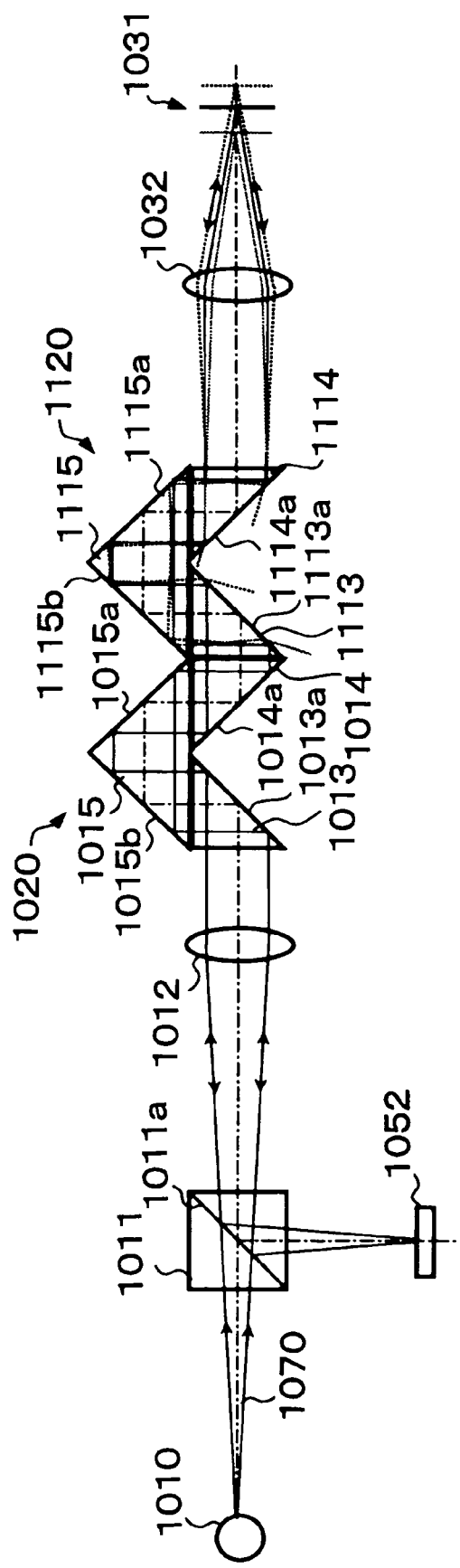
FIG. 7 is a diagram showing an optical system portion in a microscope device in a seventh embodiment of the present invention.

In the seventh embodiment shown in FIG. 7, a combination of a first parallel beam selection means 1020 and a second parallel beam selection means 1120 placed in series is used as a parallel beam selection means. Each of these parallel beam selection means 1020 and 1120 has the same construction as that of the parallel beam selection means 20 described above, but parallel light selection is performed two or more times to remarkably improve the solution (longitudinal resolution). Needless to say, a series combination of three or more parallel beam selection means each constructed as described above may be provided.

Such an arrangement in which a plurality of components of the same construction are provided to improve the performance is ascribed to the technical spirit specific to this embodiment. In the first place, it is difficult to implement such an idea as a confocal microscope or the like.

In FIG. 7, the components having the same functions as those of the components shown in FIG. 1A are indicated by reference characters each of which is the sum of 1000 (1100 for the second parallel light selection means 1120) and the number in the corresponding reference character in FIG. 1A. Detailed description will not be made of the corresponding components.

The microscope device of the present invention is not limited to those in the above-described embodiments. Various changes or modifications may be made in the above-described embodiments, and a combination of any of the features of the described embodiments may be used. For example, the device in the third embodiment shown in FIG. 3 and the device in the sixth embodiment shown in FIG. 6 may be combined to obtain a microscope device capable of three-dimensional scanning.

A well-known light source such as an LED or a high-pressure mercury lamp may be used in place of the semiconductor light source.

An arrangement using an objective lens for generating a chromatic aberration, e.g., the one described in the specification of Japanese Patent Application No. 2003-293329 filed by the applicant of the present invention may be used instead of the arrangement in which the whole or a portion of the objective lens is moved along the optical axis, to simultaneously obtain object information at different positions in the depth direction with respect to different wavelengths of light.

Needless to say, a line sensor may be used in place of the above-described planar array sensor as the image pickup device.

The object is not limited to the human body. The object may be any other kind of tissue from which reflected light can be obtained in such a manner that the light reaches internal portions of the tissue and reflected light is obtained from each of different positions in the tissue.

As described above, the microscope device of the present invention has, in the optical path from a light source to an objective lens, a collimator lens which converts a light beam incident on an objective lens into a parallel beam, and also has, in the optical path from the objective lens to an image pickup surface, a parallel beam selection means which selects only a predetermined parallel beam in the reflected light beam reflected by an object traveling from the objective lens toward the image pickup surface, and which allows the selected light beam to exit therefrom. Therefore, only the specularly reflected light beam from the convergence position on an object to be observed can be converged at one point on the image pickup surface, thus removing unnecessary noise light without placing a pin hole plate or the like before the image pickup surface as in the conventional confocal microscope. Consequently, a microscope device having a high S/N ratio, high contrast and high resolution can be obtained while relaxing restrictions on the device design freedom.

What is claimed is:

1. A microscope device comprising:
a convergence optical system in which an illumination light beam from a light source portion is caused to strike an object while being converged by an objective lens, and in which a light beam reflected from a convergence point on said object and returned to said objective lens is converged at a position on an image pickup plane in a conjugate relationship with said convergence point,
said convergence optical system including:
a collimator lens provided in an optical path from said light source portion to said objective lens, said collimator lens forming the illumination light beam from said light source portion into a parallel light beam; and
a parallel beam selection optical system which is provided in an optical path from said objective lens to said image pickup plane, and which selects only a light beam reflected from said convergence point and entering as a predetermined parallel beam and allows the selected light beam to exit therefrom,
wherein said parallel beam selection optical system is provided in the optical path between said collimator lens and said objective lens,
wherein said convergence optical system includes a polarization beam splitter provided in the optical path between said light source portion and said parallel beam selection optical system, at a branch point between the going path from said light source portion to said object and the return path from said object to said image pickup plane, and
wherein a ¼ wavelength plate is provided in the optical path between said parallel beam selection optical system and said objective lens.

2. The microscope device according to claim 1, wherein said convergence optical system includes an optical scanning mechanism for moving said illumination light beam on said object for scanning along a direction at a predetermined angle from the optical axis of said objective lens.

3. The microscope device according to claim 1, wherein said convergence optical system includes as said objective lens a microlens array in which a plurality of lens elements equal in focal length to each other are two-dimensionally arranged, and
wherein a planar optical sensor capable of detecting reflected light beams formed from light beams passing through said plurality of lens elements by reflection at the respective convergence points is provided at said image pickup plane.

4. The microscope device according to claim 1, wherein said convergence optical system includes an objective lens moving mechanism for moving the point of convergence of said illumination light beam in the axial direction of the light beam for scanning.

5. The microscope device according to claim 1, wherein said parallel beam selection optical system has at least two boundary surfaces successively receiving said reflected light beam as light incident thereon, said two boundary surfaces being placed so that angles of incidence of said predetermined parallel beam on said two boundary surfaces are substantially equal to critical angles; a light beam incident on one of said boundary surfaces at an angle smaller than the critical angle is removed by transmission through said one of said boundary surfaces; a light beam incident on said one of said boundary surfaces at an angle larger than the critical angle and reflected by the same is incident on the other of said boundary surfaces and is removed by transmission through the other of said boundary surfaces; and only the light beam incident on said two boundary surfaces respectively at the critical angles is allowed to exit from said parallel beam selection optical system.

6. The microscope device according to claim 5, wherein said boundary surfaces in said parallel beam selection optical system are configured by combining a plurality of critical-angle prisms of a right-angle prism type, said boundary surfaces being provided in oblique surfaces of said critical-angle prisms.

7. The microscope device according to claim 6, wherein said parallel beam selection optical system is configured by combining a plurality of pairs of said critical-angle prisms.

8. The microscope device according to claim 1, wherein said light source portion has a plurality of light emission ends being two-dimensionally arranged.

9. The microscope device according to claim 1, wherein said convergence optical system is placed in a portion of an endoscope probe close to the tip of the probe.

* * * * *